United States Patent
Ballard

(10) Patent No.: US 7,717,449 B2
(45) Date of Patent: May 18, 2010

(54) FLOORBOARD MOUNTED KICKSTAND PUCK

(75) Inventor: Brent Allen Ballard, 5820 Plains Rd., Eaton Rapids, MI (US) 48827

(73) Assignee: Brent Allen Ballard, Eaton Rapids, MI (US)

(*) Notice: Subject to any disclaimer, the term of this patent is extended or adjusted under 35 U.S.C. 154(b) by 279 days.

(21) Appl. No.: 11/904,089

(22) Filed: Sep. 27, 2007

(65) Prior Publication Data

US 2009/0085323 A1    Apr. 2, 2009

(51) Int. Cl.
*B62H 3/00* (2006.01)
*B60R 11/06* (2006.01)
*B62J 11/00* (2006.01)

(52) U.S. Cl. .................. 280/293; 280/164.1; 280/288.4

(58) Field of Classification Search .............. 280/164.1, 280/288.4, 291, 293; D12/113, 114, 115, D12/120
See application file for complete search history.

(56) References Cited

U.S. PATENT DOCUMENTS

| | | | | |
|---|---|---|---|---|
| 2,981,554 A * | 4/1961 | Mulder et al. | ............. | 280/164.1 |
| 4,474,387 A * | 10/1984 | Maranell et al. | ............. | 280/293 |
| 4,521,031 A * | 6/1985 | Huth | ............. | 280/293 |
| 4,625,987 A * | 12/1986 | Marsh | ............. | 280/293 |
| 5,484,153 A * | 1/1996 | Ricciardi | ............. | 280/293 |
| 5,503,420 A * | 4/1996 | Consiglio et al. | ............. | 280/288.4 |
| 5,738,180 A * | 4/1998 | Hofmann et al. | ............. | 180/291 |
| 5,961,138 A * | 10/1999 | Roark et al. | ............. | 280/291 |
| D467,527 S * | 12/2002 | Cole et al. | ............. | D12/115 |
| 2004/0262880 A1* | 12/2004 | McClure | ............. | 280/293 |
| 2005/0087575 A1* | 4/2005 | Samsel et al. | ............. | 224/413 |

* cited by examiner

*Primary Examiner*—Lesley Morris
*Assistant Examiner*—Daniel Yeagley

(57) ABSTRACT

A kickstand puck were it's thickness matches the gap between the frame and isolation pad of a motorcycle floorboard. The two end shapes are formed to match the inside form of the outboard side of a floorboard frame. A groove down the center of one side of the puck is at a width and depth to match the full form of the inboard side of a floorboard frame.

3 Claims, 2 Drawing Sheets

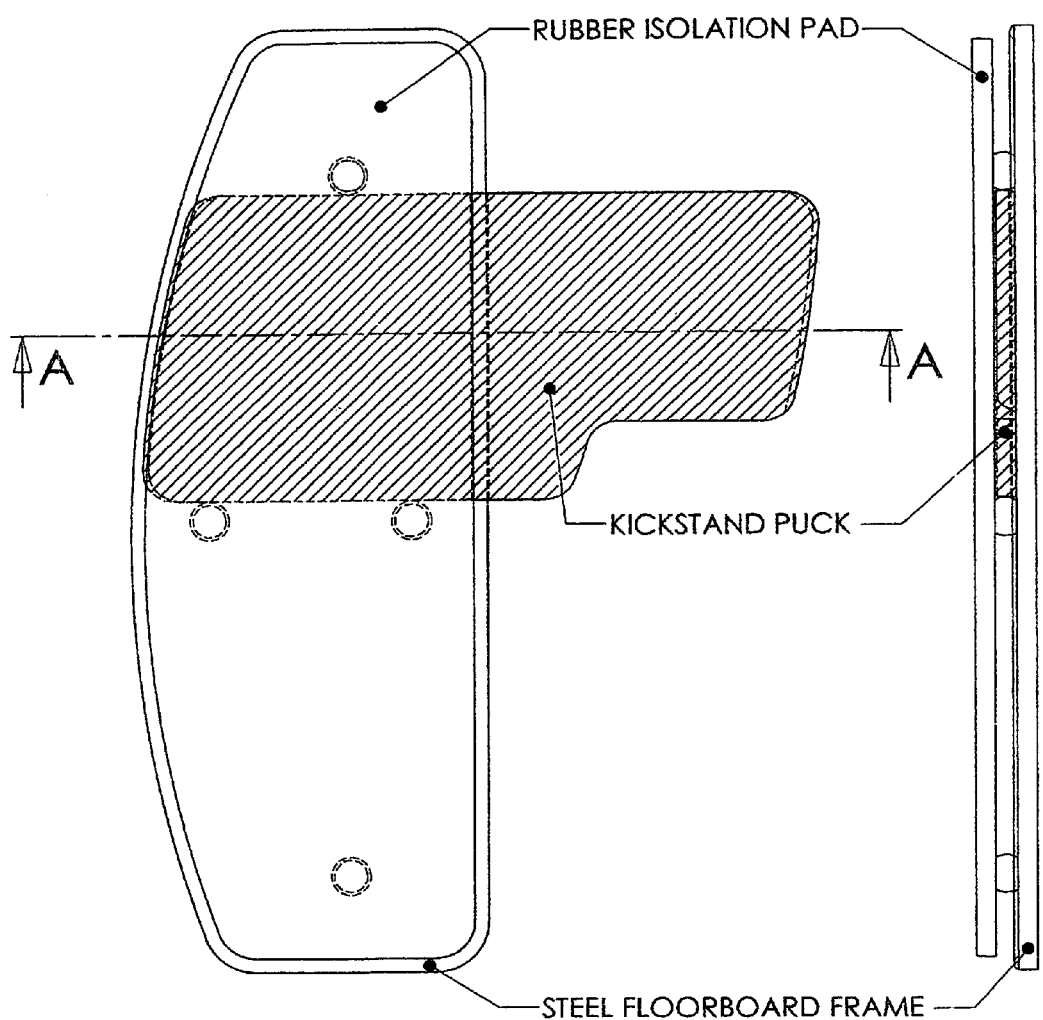
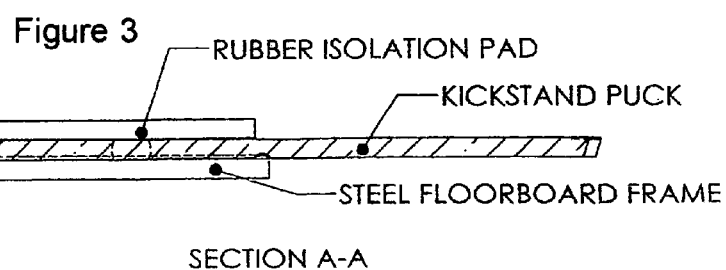

FLOORBOARD MOUNTED KICKSTAND PUCK

BACKGROUND OF THE INVENTION

Came up with this invention while watching motorcycle riders fumble around when holding their motorcycle up and trying to reach what ever they were going to place under the kickstand to keep it from sinking into the soft soil. I have seen many items used for this but all seem to be carried in an inconvenient place or not carried at all because of inconvenience.

BRIEF SUMMERY OF INVENTION

The invention cures the inconvenience of storing a kickstand puck on the motorcycle and turns it into a simple task of storing the kickstand puck with easy, convenient accessibility when use is needed. The kickstand puck is designed to be self storing to the existing motorcycle floorboards with easy access while the rider remains in the seated position of the motorcycle which is a critical element to this invention. The kickstand puck will be used underneath a motorcycle kickstand to keep the kickstand from sinking into soft soil while the motorcycle is parked and therefore helping to prevent the motorcycle from tipping over. When the kickstand puck is not in use the kickstand puck is designed to be self storing in the motorcycle's existing floorboards and accessible to the rider from the seated position.

BRIEF DESCRIPTION OF DRAWINGS

FIG. 1, Top view of the footboard and kickstand puck.
FIG. 2, Longitudinal side view of the footboard and kickstand puck.
FIG. 3, Lateral side view of the footboard and kickstand puck.

DETAILED DESCRIPTION OF THE INVENTION

FIGS. 1-3 show the kickstand puck in the stored position on the motorcycle floor board. The kickstand puck has been slid between a floorboard isolation pad and a floorboard steel frame. The kickstand puck is being trapped in place by the design of its shape and size. FIG. 1 is a top view as seen from the riding position of the motorcycle. Section A is a view showing how the shape of kickstand puck along with its thickness is what keeps the kickstand puck itself secured in between the isolation pad and the steel frame of floorboard.

Figure 4:
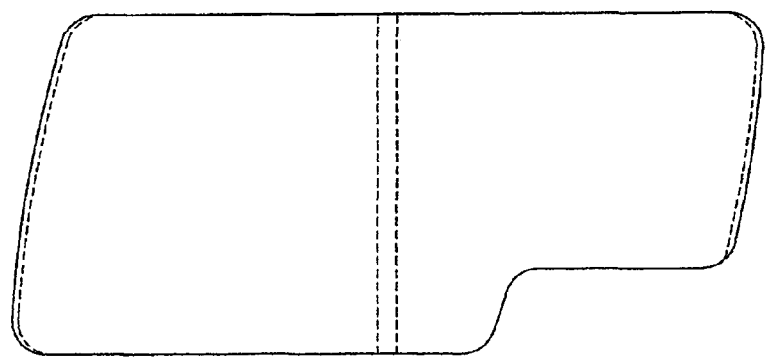
FIG. 4, lop view of the kickstand puck.
Figure 5:
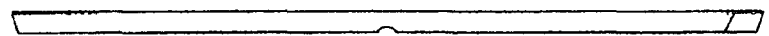
FIG. 5, longitudinal side view of the kickstand puck.

FIGS. 3-5 show the kickstand puck only. The kickstand puck being made of plastic by an injection mold process. This will allow the kickstand puck to be light weight, strong, heat and weather resistant. The kickstand puck has been designed to specific dimensions that will allow the kickstand puck to be self securing for storage while not in use, to an existing floorboard of a motorcycle. The kickstand puck has been designed to be gently removed from or inserted into the motorcycle floorboard while the rider remains in the seated position on the motorcycle. The kickstand puck is designed to be secured to the floorboard without the use of any fasteners or tools. The thickness of the kickstand puck has been predetermined to fit snuggly between the isolation pad and the steel frame of the motorcycle floorboard while the end shapes and center groove of the kickstand puck have been designed to fit the contour of the floorboard's steel flame. This exacting size and shape is what allows the kickstand puck to be self securing without the need for fasteners of any sort. The taper shape of the ends of the kickstand puck is also what allows for the kickstand puck to be gently inserted or removed while remaining in the seated position.

The invention claimed is:

1. A floorboard mounted kickstand puck for a motorcycle comprising a kickstand puck for placing under a kickstand of the motorcycle to keep the kickstand from sinking into soft soil when in an operative position,
    wherein the kickstand puck is designed to be self storing in a stored position in an existing motorcycle floorboard with easy access to the kickstand puck while a rider remains in a seated position on the motorcycle,
    wherein the kickstand puck comprises a predefined thickness designed to fit snug between an isolation pad and a steel frame of the motorcycle floorboard for securing the kickstand puck in the stored position, without the use of any fasteners or tools.

2. The kickstand puck of claim 1, wherein the kickstand puck further comprises end shapes being tapered to allow for the kickstand puck to be gently inserted or removed from between the isolation pad and steel frame of the floorboard.

3. The kickstand puck of claim 1, wherein the kickstand puck further comprises a center groove designed to fit a contour of the steel frame of the floorboard to trap the kickstand puck in the stored position by a fitting engagement of the steel frame of the floorboard into the center groove of the kickstand puck.

* * * * *